(12) United States Patent
Maier et al.

(10) Patent No.: US 11,618,797 B2
(45) Date of Patent: Apr. 4, 2023

(54) ACRYLATE-OLEFIN COPOLYMERS AS HIGH VISCOSITY BASE FLUIDS

(71) Applicant: Evonik Operations GmbH, Essen (DE)

(72) Inventors: Stefan Karl Maier, Ober-Ramstadt (DE); Dieter Janßen, Groß-Umstadt (DE); Fabian Ziegler, Darmstadt (DE); Katrin Schöller, Bad Soden (DE); Stefan Hilf, Zwingenberg (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/542,614

(22) Filed: Dec. 6, 2021

(65) Prior Publication Data

US 2022/0195091 A1 Jun. 23, 2022

(30) Foreign Application Priority Data

Dec. 18, 2020 (EP) ..................... 20215450

(51) Int. Cl.
| | | |
|---|---|---|
| *C10M 107/10* | (2006.01) | |
| *C08F 220/18* | (2006.01) | |
| *C08F 210/14* | (2006.01) | |
| *C08F 220/56* | (2006.01) | |
| *C08F 222/14* | (2006.01) | |
| *C10M 107/28* | (2006.01) | |
| *C10M 143/08* | (2006.01) | |
| *C10M 145/14* | (2006.01) | |
| *C10N 20/02* | (2006.01) | |
| *C10N 20/04* | (2006.01) | |
| *C10N 30/02* | (2006.01) | |
| *C10N 40/04* | (2006.01) | |
| *C10N 40/08* | (2006.01) | |
| *C10N 40/25* | (2006.01) | |
| *C10N 50/10* | (2006.01) | |

(52) U.S. Cl.
CPC ...... *C08F 220/1808* (2020.02); *C08F 210/14* (2013.01); *C08F 220/56* (2013.01); *C08F 222/14* (2013.01); *C10M 107/10* (2013.01); *C10M 107/28* (2013.01); *C10M 143/08* (2013.01); *C10M 145/14* (2013.01); *C10M 2205/0285* (2013.01); *C10M 2209/0806* (2013.01); *C10N 2020/02* (2013.01); *C10N 2020/04* (2013.01); *C10N 2030/02* (2013.01); *C10N 2040/04* (2013.01); *C10N 2040/08* (2013.01); *C10N 2040/25* (2013.01); *C10N 2050/10* (2013.01)

(58) Field of Classification Search
CPC ........ C08F 220/1808; C08F 210/14; C08F 220/56; C08F 222/14; C10M 107/10; C10M 107/28; C10M 143/08; C10M 145/14; C10M 2205/0285; C10M 2209/0806
USPC .......................................... 508/472
See application file for complete search history.

(56) References Cited

U.S. PATENT DOCUMENTS

| | | | | |
|---|---|---|---|---|
| 3,856,685 | A * | 12/1974 | Mori .................... | C10M 147/04 526/329 |
| 3,968,148 | A * | 7/1976 | Leister ................. | C08F 10/00 548/312.7 |
| 3,994,958 | A | 11/1976 | Leister et al. | |
| 4,009,195 | A * | 2/1977 | Leister ................. | C07D 233/16 560/171 |
| 4,419,106 | A * | 12/1983 | Miller ................. | C08F 220/1818 526/329 |
| 5,306,437 | A * | 4/1994 | Heinrichs ............ | C08F 220/06 508/472 |
| 5,435,928 | A | 7/1995 | Beck | |
| 5,691,284 | A * | 11/1997 | Beyer ................. | C10M 143/00 508/472 |
| 5,939,365 | A * | 8/1999 | Redpath .............. | C10M 157/00 508/591 |
| 6,080,794 | A * | 6/2000 | Auschra .............. | C10G 33/04 508/472 |
| 6,475,964 | B1 * | 11/2002 | Neudoerfl ........... | C10M 137/10 252/79 |
| 9,617,495 | B2 | 4/2017 | Ghahary et al. | |
| 10,920,164 | B2 | 2/2021 | Klein et al. | |

(Continued)

FOREIGN PATENT DOCUMENTS

| | | |
|---|---|---|
| DE | 22 43 064 A1 | 3/1973 |
| DE | 3223694 A1 | 3/1983 |

(Continued)

OTHER PUBLICATIONS

Pletsch et al., U.S. Appl. No. 17/292,451, "Random copolymers for use as base oils or lubricant additives," priority date Nov. 13, 2018.

(Continued)

*Primary Examiner* — Ellen M McAvoy
(74) *Attorney, Agent, or Firm* — Taylor English Duma LLP; Philip P. McCann

(57) ABSTRACT

The invention relates to acrylate-olefin copolymers and to a method for preparing these polymers. The present invention is also directed to lubricant compositions comprising these copolymers, and to the use of these copolymers as a lubricant additive or a synthetic base fluid in a lubricating oil composition, preferably in a gear oil composition, a transmission oil composition, a hydraulic oil composition, an engine oil composition, a marine oil composition, an industrial lubricating oil composition or in grease.

19 Claims, No Drawings

(56) References Cited

U.S. PATENT DOCUMENTS

| | | | |
|---|---|---|---|
| 2007/0117725 A1* | 5/2007 | Hsu | C10M 145/14 508/471 |
| 2013/0165360 A1 | 6/2013 | Patil et al. | |
| 2019/0382681 A1 | 12/2019 | Maier et al. | |
| 2021/0137276 A1 | 5/2021 | Landers et al. | |

FOREIGN PATENT DOCUMENTS

| | | | |
|---|---|---|---|
| DE | 10 2010 028 195 A1 | 10/2011 |
| EP | 0 471 266 A1 | 2/1992 |
| WO | 96/17517 A1 | 6/1996 |
| WO | 01/46350 A1 | 6/2001 |
| WO | 2020/078770 A1 | 4/2020 |

OTHER PUBLICATIONS

Pletsch et al., U.S. Appl. No. 17/292,452, "Process for preparing random copolymers," priority date Nov. 13, 2018.

Bataille et al., "Preparation and Characterization of a Viscosity Index Improver for Naphthenic and Paraffinic Base Oils," copyright 1994, Plenum Publishing Corporation, vol. 23, Issue 2, pp. 325-338 (15 pages).

European Search Report dated Jun. 7, 2021 in EP 20215450.6 (7 pages).

Mohamad et al., "Investigation of polyacrylates copolymers as lube oil viscosity index improvers," copyright 2012, Journal of Petroleum Science and Engineering, 100, pp. 173-177 (5 pages).

Ray et al., "Poly-a-olefin-based synthetic lubricants: a short review on various synthetic routes," Lubrication Science, copyright 2012, 24, pp. 23-44 (22 pages).

Saha et al., "Synthesis, characterization and performance evaluation of long chain methacrylate-octene copolymer for lubricant formulation," Journal of Macromolecular Science, Part A: Pure and Applied Chemistry, copyright 2019, vol. 56, No. 11, pp. 1050-1059 (11 pages).

* cited by examiner

ACRYLATE-OLEFIN COPOLYMERS AS HIGH VISCOSITY BASE FLUIDS

CROSS REFERENCE TO RELATED APPLICATIONS

This application is a 35 U.S.C. § 119 patent application which claims the benefit of European Application No. 20215450.6 filed Dec. 18, 2020, which is incorporated herein by reference in its entirety.

FIELD

The invention relates to acrylate-olefin copolymers and to a method for the preparation of these polymers. The present invention is also directed to lubricant compositions comprising these copolymers, as well as to the use of these copolymers as a lubricant additive or a synthetic base fluid in a lubricating oil composition, preferably in a gear oil composition, a transmission oil composition, a hydraulic oil composition, an engine oil composition, a marine oil composition, an industrial lubricating oil composition or in grease.

BACKGROUND

The present invention relates to the field of lubrication. Lubricants are compositions that reduce friction between surfaces. In addition to allowing freedom of motion between two surfaces and reducing mechanical wear of the surfaces, a lubricant also may inhibit corrosion of the surfaces and/or may inhibit damage to the surfaces due to heat or oxidation. Examples of lubricant compositions include, but are not limited to, engine oils, transmission fluids, gear oils, industrial lubricating oils, greases and metalworking oils.

Lubricants typically contain a base fluid and variable amounts of additives. Conventional base fluids are hydrocarbons, such as mineral oils. The terminology base oil or base fluid is commonly used interchangeably. Here, base fluid is used as a general term.

A wide variety of additives may be combined with the base fluid, depending on the intended use of the lubricant. Examples of lubricant additives include, but are not limited to, viscosity index improvers, thickeners, oxidation inhibitors, corrosion inhibitors, dispersing agents, high pressure additives, anti-foaming agents and metal deactivators.

Typical non-polymeric base fluids are less effective as lubricants, because of their low viscosity and further decreased viscosity at higher operating temperatures. Therefore, polymeric additives are used to thicken the base oil and reduce the change in viscosity with change in temperature. The term Viscosity Index (VI) is used to describe this change in viscosity with temperature. The lower the VI, the greater the change in viscosity with temperature, and vice versa. Thus, a high VI is desired for lubricant formulations. In order to improve VI, polymeric additives or Viscosity Index Improvers (VII) may be added to a lubricant formulation.

It is well-known in the art that alkyl acrylates are not recommended in VI improver application, and commercial VI improvers are based on methacrylates. While literature (Rashad et al. J. of Petr. Sci. and Engineering 2012, 173-177; Evin et al. J. of Sol. Chem 1994, 325-338) and patents (WO 96/17517) exist, it is generally known that the performance of polyacrylates as VI improver is inferior to the ones of polymethacrylates. Especially in WO 96/17517 it is mentioned that it was unexpectedly found that poly(alkyl acrylate) esters typically fail to adequately reduce the effect of temperature on viscosity when used in the hydraulic fluids.

The drawback of adding polymeric additives to a lubricant formulation is that they will undergo shear stress and will mechanically degrade over time. Higher molecular weight polymers are better thickeners but will be more prone to shear stress leading to polymer degradation. In order to decrease the amount of polymer degradation, the molecular weight of a polymer can be decreased, thereby obtaining a more shear stable polymer. These shear stable low molecular weight polymers are no longer very effective thickeners and must be used in larger concentrations in the lubricant in order to reach a desired viscosity. These low molecular weight polymers typically have molecular weights below 20,000 g/mol and are also called synthetic high viscosity base fluids. High viscosity base fluids are used to lift the VI and to thicken lubricant formulations with demanding shear stability requirements. A typical application are gear oils which have very demanding requirements due high mechanical stress and a broad temperature range in operation.

Typical products in this market are high viscosity polyalphaolefins (PAOs) and metallocene polyalphaolefins (mPAOs), typically sold in viscosity ranges from 40 to 300 cSt at 100° C. (Choudary et al. Lubr. Sci. 2012, 23-44), whose key feature is good handling properties in term of viscosity since these base fluids are polymeric in nature and provide for an improved viscosity index. However, their weakness is the low polarity. Due to the apolar nature of PAO base oils DI packages and ageing products are poorly dissolved in the oil causing various problems.

It has been already described that higher polarity is provided by copolymers of alpha-olefins with maleates (DE3223694), copolymers of alpha-olefins and acrylates (DE2243064), copolymers of alpha-olefins and methacrylates (EP0471266) or terpolymers based on the aforementioned monomers (WO2020078770). Alternatively, oil compatible polyesters (WO0146350), poly alkyl(meth)acrylates (DE102010028195) or polyvinylethers (US20130165360) can be applied. A big advantage when polar high viscosity base fluids are used is that no polar low viscous fluids, such as esters, must be used as compatibilizers for the polar lubricant additives. Polar low viscous fluids are known to cause problems with coatings and seals which is less of an issue for high viscosity fluids.

Existing products, such as polyalphaolefins (PAOs), do not have the necessary performance level for some applications. There is also a need to provide alternative solutions in the area of industrial gear oils and not only for industrial lubricants. In particular, it would be desirable to replace existing high viscosity polyalphaolefins, as these products are expensive, and do not provide sufficient solubility for crucial formulation components.

It was therefore an object of the present invention to provide highly shear stable synthetic base fluids or lubricating oil additives, which, in lubricant oil compositions, have a positive influence on oil solubility and component solubility, as well as on low temperature performance. Furthermore, these new polymers should be able thicken an oil to a desired viscosity. These highly shear stable polymers should also have a high viscosity index, high flash point, and good thermo-oxidative stability.

SUMMARY

The inventors of the present invention have surprisingly found that acrylate-olefin copolymers are useful as highly shear stable lubricating oil additives or synthetic base fluids, depending on their treat rate in the lubricating composition. The acrylate-olefin copolymers according to the invention have higher viscosity index than their methacrylate counterparts as exemplified in the experimental part of the present invention, which was unexpected. The inventors of the present invention have found that the side chains of the resulting polymer which are derived from the acrylate monomer, but also from the alpha-olefin are crucial to achieve a combination of high VI and good low temperature properties.

A first aspect of the invention is an acrylate-olefin copolymers.

A second aspect of the invention is a method for preparing these copolymers.

A third aspect of the invention is a lubricant composition comprising at least one base oil and at least one copolymer according to the invention.

A fourth aspect of the invention is the use of these copolymers as lubricant additive or synthetic base fluid in a lubricating oil composition, preferably in a gear oil composition, a transmission oil composition, a hydraulic oil composition, an engine oil composition, a marine oil composition, an industrial lubricating oil composition or in grease.

DETAILED DESCRIPTION

Copolymer According to the Invention

The present invention relates to a copolymer comprising:
a) 65 to 90% by weight, based on the total weight of the copolymer, of monomer units derived from at least one acrylate of Formula (I),

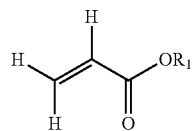
(I)

wherein $R_1$ means a linear or branched alkyl group having from 6 to 12 carbon atoms,
b) 10 to 35% by weight, based on the total weight of the copolymer, of monomer units derived from at least one non-functionalized alpha-olefin of Formula (II),

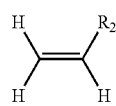
(II)

wherein $R_2$ means a linear alkyl group having from 6 to 16 carbon atoms,
c) 0 to 10% by weight of monomer units derived from at least one monomer selected from the list consisting of methacrylamides, fumarates, maleates or a mixture thereof, based on the total weight of the copolymer, and
wherein the copolymer has a kinematic viscosity at 100° C. from 80 to 600 cSt according to ASTM D 445, and
wherein the copolymer comprises from 0 to 22% by weight of monomer units derived from monomers with linear alkyl group having more than 8 carbon atoms, based on the total weight of the copolymer.

According to one aspect of the invention, it is preferred that the copolymer comprises 0 to 20% by weight, more preferably 0 to 18% by weight, of monomer units derived from monomers with linear alkyl group having more than 8 carbon atoms, based on the total weight of the copolymer.

According to another aspect of the invention, it is preferred that the copolymer has a kinematic viscosity at 100° C. from 100 to 500 cSt according to ASTM D 445, more preferably from 150 to 400 cSt according to ASTM D 445, more preferably from 150 to 350 cSt according to ASTM D 445.

According to another preferred aspect of the invention, the total content of monomer units derived from monomers a) and b) in the copolymer of the invention sums up to 90% by weight, more preferably sums up to 95% by weight, even more preferably sums up to 98% by weight, most preferably sums up to 100% by weight, based on the total weight of the copolymer.

According to another preferred aspect of the invention, the total content of monomer units derived from monomers a), b) and c) in the copolymer of the invention sums up to 90% by weight, more preferably sums up to 95% by weight, even more preferably sums up to 98% by weight, most preferably sums up to 100% by weight, based on the total weight of the copolymer.

The acrylate a) of Formula (I) refers to esters of acrylic acid with straight chain or branched alcohols having 6 to 12 carbon atoms, preferably 6 to 10 carbon atoms, more preferably 8 to 10 carbons. The term encompasses individual acrylic esters with an alcohol of a particular length, and likewise mixtures of acrylic esters with alcohols of different lengths.

According to one aspect of the invention, it is preferred that $R^1$ in the acrylate monomer of Formula (I) is a linear or branched alkyl group having from 6 to 10 carbon atoms, more preferably linear or branched alkyl group having 8 to 10 carbon atoms. Particularly preferred acrylates a) of Formula (I) are 2-ethylhexyl acrylate, 2-propylheptyl acrylate, n-octylacrylate or a mixture thereof.

According to the present invention, it is preferred that the copolymer of the invention comprises 70 to 90% by weight, more preferably 75 to 90% by weight, of monomer units derived from the acrylate monomer a) of Formula (I), based on the total weight of the copolymer.

According to the present invention, it is preferred that the copolymer of the invention comprises 10 to 30% by weight, more preferably 10 to 25% by weight, of monomer units derived from the non-functionalized alpha-olefin b) of Formula (II), based on the total weight of the copolymer. Particularly preferred non-functionalized alpha-olefins b) of Formula (II) are selected from the group consisting of decene, dodecene, tetradecene, hexadecene or a mixture thereof.

According to a preferred aspect of the present invention, the copolymer has a weight-average molecular weight from 5,000 to 30,000 g/mol, preferably from 7,000 to 25,000 g/mol, even more preferably from 8,000 to 20,000 g/mol according to DIN 55672-1.

In the present invention, the weight-average molecular weights (Mw) or number-average molecular weights ($M_n$) of the copolymers were determined by gel permeation chromatography (GPC) using PMMA calibration standards according to DIN 55672-1 using the following measurement conditions:
Eluent: tetrahydrofuran (THF)
Operation temperature: 35° C.

Columns: the column set consists of four columns: two columns SDV 106 Å, one column SDV 104 Å and one column SDV 103 Å (PSS Standards Service GmbH, Mainz, Germany), all with the size of 300×8 mm and an average particle size of 10 μm Flow rate: 1 mL/min Injected volume: 100 μIL Instrument: Agilent 1100 series consisting of an autosampler, pump and column oven Detection device: a refractive index detector from Agilent 1100 series.

Preferably, the copolymers of the invention have a very low degree of cross-linking and a narrow molecular weight distribution, which further contribute to their shear resistance. The low degree of crosslinking and the narrow molecular weight are reflected in the polydispersity index of the copolymers. Preferably, the polydispersity index (PDI) of the copolymers according to the invention is in the range of 1.0 to 4.0, more preferably 1.5 to 3.5. A polydispersity index in the range of 1.0 to 3.5 is considered optimal for most industrial applications with regard to the shear resistance of the copolymers. The polydispersity index is defined as the ratio of weight-average molecular weight to number-average molecular weight (Mw/Mn).

According to a preferred aspect of the present invention, the copolymer of the invention has a COC flashpoint above 250° C. according to ASTM D92.

The copolymers of the invention optionally comprise monomer units derived from monomer c), which is selected from the list consisting of methacrylamides, fumarates, maleates or a mixture thereof. Preferably, the amount of monomer units derived from monomer c) in the resulting copolymer of the invention is from 0 to 10% by weight, preferably from 0 to 7% by weight, more preferably from 0 to 5% by weight, even more preferably from 0 to 3% by weight, based on the total weight of the copolymer. Particularly preferred monomers c) are di-2-ethylhexyl maleate, N-3-dimethylamino propyl methacrylamide di-2-ethylhexyl fumarate, or a mixture thereof.

It has been surprisingly observed that the incorporation of monomer units c) in the copolymer allows a full conversion of the non-functionalized alpha-olefins b) and thus no final distillation step is needed at the end of the copolymerization.

According to a preferred aspect of the present invention, on top of monomer units derived from monomers a), b) and optionally c), the acrylate-olefin copolymer of the invention further comprises 0 to 10% by weight, more preferably 0 to 6% by weight, based on the total weight of the copolymer, of monomer units derived from at least one monomer d) selected from alkyl (meth)acrylates, vinyl esters or a mixture thereof. Particularly preferred monomers d) are lauryl methacrylate (LMA), stearyl methacrylate (SMA) or vinyl laurate (VLA).

According to another preferred aspect of the present invention, the total content of monomer units of monomers a), b) c) and d) sums up to 95% by weight, more preferably 98% by weight, even more preferably 100% by weight, According to another preferred aspect of the invention, when the copolymer consists of monomer units derived from monomers a), b), optionally c) and optionally d), the copolymer comprises 0 to 22% by weight, more preferably 0 to 20% by weight, even more preferably 0 to 18% by weight, of monomer units derived from monomers a), b), c) and d) with linear alkyl group having more than 8 carbon atoms, based on the total weight of the copolymer.

According to the invention, the copolymer is a statistical copolymer, with a sequential distribution of the monomer units derived from monomers a) and b) and optionally monomers c) and d).

Preferable Copolymers of the Invention

According to a preferred aspect of the invention, the copolymer comprises:
a) 65 to 90% by weight, more preferably 70 to 90% by weight, even more preferably 75 to 90% by weight, based on the total weight of the copolymer, of monomer units derived from at least one acrylate of Formula (I),

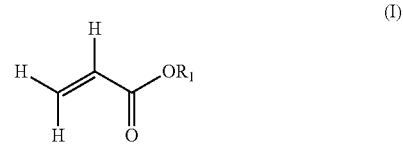

wherein $R_1$ means a linear or branched alkyl group having from 8 to 10 carbon atoms, b) 10 to 35% by weight, more preferably 10 to 30% by weight, even more preferably 10 to 25% by weight, based on the total weight of the copolymer, of monomer units derived from at least one non-functionalized alpha-olefin of Formula (II),

wherein $R_2$ means a linear alkyl group having from 8 to 12 carbon atoms, c) 0 to 10% by weight, more preferably 0 to 5% by weight, even more preferably 0 to 3% by weight, of monomer units derived from at least one monomer selected from the list consisting of methacrylamides, fumarates, maleates or a mixture thereof, based on the total weight of the copolymer, and wherein the copolymer has a kinematic viscosity at 100° C. from 80 to 600 cSt according to ASTM D 445, and wherein the copolymer comprises from 0 to 22% by weight, preferably 0 to 18% by weight, of monomer units derived from monomers with linear alkyl group having more than 8 carbon atoms, based on the total weight of the copolymer.

According to a preferred embodiment, the total content of monomer units of monomers a), b) and c) sums up to 95% by weight, more preferably 98% by weight, even more preferably 100% by weight, based on the total weight of the copolymer.

According to a preferred embodiment, the copolymer further comprises 0 to 10% by weight, more preferably 0 to 6% by weight, based on the total weight of the copolymer, of monomer units derived from at least one monomer d) selected from alkyl (meth)acrylates, vinyl ester or a mixture thereof. Particularly preferred monomers d) are lauryl methacrylate (LMA), stearyl methacrylate (SMA) or vinyl laurate (VLA).

According to a preferred embodiment, the total content of monomer units of monomers a), b), c) and d) sums up to 95% by weight, more preferably 98% by weight, even more preferably 100% by weight, Method for Preparing the Copolymer According to the Invention According to the present invention, the above-mentioned polymers are prepared following the method comprising the steps of:
i) providing a monomer composition as described above; and
ii) initiating radical polymerization in the monomer composition.

Standard free-radical polymerization is detailed, inter alia, in Ullmann's Encyclopedia of Industrial Chemistry, Sixth Edition. In general, a polymerization initiator and optionally a chain transfer agent are used for this purpose.

The polymerization can be conducted under standard pressure, reduced pressure or elevated pressure.

For the radical copolymerization of olefins with acrylates, the polymerization temperature is critical. In general, the copolymerization temperature is in the range from 140 to 180° C., preferably from 150 to 170° C.

The polymerization step ii) may be performed with or without dilution in oil. Preferably, the polymerization step (ii) is made without dilution oil or any solvent.

Preferably, step (ii) comprises the addition of a radical initiator. Preferably, the radical initiator is selected from di-tert-butyl peroxide or dicumyl peroxide. Preferably, the total amount of radical initiator relative to the total weight of the monomer mixture is 0.01 to 5% by weight, more preferably 0.1 to 1% by weight. Preferably, the total amount of radical initiator is added continuously over the course of the copolymerization reaction (ii).

Preferably, the copolymerization step (ii) is made by feeding the acrylate monomers a), and optionally the monomers c) or any other comonomers, together with the initiator to the non-functionalized alpha-olefin monomers b). Preferably, the total reaction time of the radical polymerization is 2 to 5 hours, more preferably 3 hours.

In another preferred aspect of the invention, a third step iii) is optionally performed, corresponding to a distillation step to remove the unreacted alpha-olefin monomer b).

Preferably, residual unreacted alpha-olefin monomer b) is removed by distillation at 150° C. and pressures as low as 5 mbar using a rotary evaporator. Advantageously, no distillation step iii) is needed when the copolymer of the invention comprises monomer units derived from monomer c). It has been surprisingly observed that small amounts of monomers c) (below 10% by weight, more preferably below 5% by weight, based on the total weight of the copolymer) enhance the conversion of the olefins during copolymerization (lower than 1% by weight residual unreacted alpha-olefin b)), so that no distillation step iii) is needed.

Lubricating Oil Compositions

As indicated above, the present invention also relates to a lubricating oil composition comprising at least one base oil and at least one copolymer as defined in the present invention.

The base oils correspond to lubricant base oils, mineral, synthetic or natural, animal or vegetable oils suited to their use/chosen depending on the intended use.

The base oils used in formulating the lubricating oil compositions according to the present invention include, for example, conventional base stocks selected from API (American Petroleum Institute) base stock categories known as Group I, Group II, Group III, Group IV and Group V. The Group I and II base stocks are mineral oil materials (such as paraffinic and naphthenic oils) having a viscosity index (or VI) of less than 120. Group I is further differentiated from Group II in that the latter contains greater than 90% saturated materials and the former contains less than 90% saturated material (that is more than 10% unsaturated material). Group III is considered the highest level of mineral base oil with a VI of greater than or equal to 120 and a saturates level greater than or equal to 90%. Preferably the base oil included in the lubricating oil composition of the present invention is selected from the group consisting of API Group II and III base oils. Most preferably, the lubricant composition comprises an API Group III base oil. Group IV base oils are polyalphaolefins (PAO). Group V base oils are esters and any other base oils not included in Group I to IV base oils. These base oils can be used individually or as a mixture.

In a preferred embodiment of the invention, the lubricating oil composition comprises from 0.1 to 99.9% by weight, preferably from 1 to 95% by weight, of at least one base oil and from 0.1 to 99.9% by weight, preferably from 5% to 99% by weight, of at least one copolymer according to the present invention, based on the total weight of the lubricating composition.

The lubricating oil compositions according to the present invention may also comprise any other additional additives suitable for use in the formulations. These additives include additional viscosity index improvers, pour point depressants, dispersants, demulsifiers, defoamers, lubricity additives, friction modifiers, antioxidants, detergents, dyes, corrosion inhibitors and/or odorants.

Applications for the Copolymer of the Invention

The invention also relates to the use of the copolymer according to the present invention as a lubricant additive or a synthetic base fluid in a lubricating oil composition, preferably in a gear oil composition, a transmission oil composition, a hydraulic oil composition, an engine oil composition, a marine oil composition, an industrial lubricating oil composition or in grease.

EXPERIMENTAL PART

The invention is further illustrated in detail hereinafter with reference to examples and comparative examples, without any intention to limit the scope of the present invention. All percentages in relation to monomers or base fluids given in the tables below are weight percentages (wt %).

Abbreviations

BF-26 Brookfield viscosity measured at −26° C.
BF-30 Brookfield viscosity measured at −26° C.
BV bulk viscosity
BV40 bulk viscosity @40° C. in accordance with ASTM D445
BV100 bulk viscosity @100° C. in accordance with ASTM D445
cSt centistokes
cP centipoise
DBPO di-tert-butyl peroxide
DCP dicumyl peroxide
Dec decene
DEHF di-2-ethylhexyl fumarate
DEHM di-2-ethylhexyl maleate
DMAPMAM N-3-dimethylamino propyl methacrylamide
DoDec dodecene
EHA 2-ethylhexyl acrylate
EHMA 2-ethylhexyl methacrylate
HA hexyl acrylate
HexDec hexadecene Hitec® 2030 defoamer commercially available from Afton Hitec® 307 DI Package commercially available from Afton Hitec® 3250 DI Package commercially available from Afton IDA iso-decyl acrylate IDMA iso-decyl methacrylate Ini initiator ITDA iso-tridecyl acrylate, commercially available from Aldrich KV kinematic viscosity measured according to ASTM D445

$KV_{40}$ kinematic viscosity measured @40° C. to ASTM D445

$KV_{100}$ kinematic viscosity measured @100° C. to ASTM D445

LA lauryl acrylate, dodecylacrylate

LMA lauryl methacrylate, 73% C12, 27% C14, all linear

Mn number-average molecular weight

MO methyloleate

Mw weight-average molecular weight n.m. not measured nOA n-octylacrylate

NB3080 Nexbase® 3080; Group III base oil from Neste with a KV100 of 7.9 cSt

PAO100 polyalphaolefin base oil with a KV100 of 100 cSt from Chevron Phillips

PAO4 polyalphaolefin base oil with a KV100 of 4 cSt

PAO6 polyalphaolefin base oil with a KV100 of 6 cSt

PAO8 INEOS Durasyn 168 polyalphaolefin base oil with a $KV_{100}$ of 7.8 cSt

PAO8 I INEOS Durasyn 128polyalphaolefin base oil with a $KV_{100}$ of 7.8 cSt

PDI polydispersity index

PHA 2-propylheptyl acrylate

PP pour point

Priolube 3970 ester base fluid available from Croda

RC9420 DI package commercially available from Rheinchemie

ReMo Residual Monomer content

SMA stearyl methacrylate, 35% C16, 65% C18, all linear

SL KRL20 shear loss after 20 hours KRL measurement determined at 100° C.

SL KRL100 shear loss after 100 hours KRL measurement determined at 100° C.

TetDec tetradecene

VI viscosity index

VLA vinyl laurate

VPL 1-180 Evonik VISCOPLEX® 1-180, pour point depressant

VPL 1-300 Evonik VISCOPLEX® 1-300, pour point depressant

Yubase 4 Group III base oil from SK Lubricants with a $KV_{100}$ of 4 cSt

Test Methods

KV ASTM D445

VI ASTM D2270

PP ASTM D5950

Copper Corrosion ASTM D130

Steel Corrosion DIN ISO 7120

TOST ASTM D2893

RPVOT ASTM D2272

Foam ASTM D892

KRL CEC L-45-A-99

BF ASTM D2983

COC ASTM D92

In the present invention, the bulk viscosity (BV) of the product (product obtained from polymerization reaction) corresponds to the kinematic viscosity (KV) of the resulting product of the polymerization measured in accordance with ASTM D 445. Thus, the bulk viscosity of the polymers, BV40 and BV100 as shown in Tables 1, 2, 3 and 4 below, were measured as kinematic viscosity at 40° C. and 100° C., respectively, in accordance with ASTM D445.

EXAMPLES

Synthesis 1: Pure Acrylate (Ex.39*)

1.62 g of DBPO (0.6 wt % relative to the amount of acrylate) dissolved in 270.0 g EHA was slowly fed to 30.0 g of PAO8 under nitrogen at 160° C. for 3 hours. After stirring for another hour, the resulting clear and colorless polymer solution was cooled down and used in the further experiments without further purification.

Synthesis 2: (Meth)Acrylate/Olefin Copolymer with Distillation Step (Ex.8)

3.6 g of DBPO (0.3 wt % relative to the monomer in the feed) dissolved in 1200 g EHA was slowly fed to 300 g (0.33 molar equivalents relative to the (meth)acrylate) of 1-Decene under nitrogen at 160° C. for 3 hours. After stirring for another hour, the resulting clear and colorless polymer was cooled down. Subsequently, the residual decene was removed by distillation at 150° C. and pressures as low as 5 mbar using a rotary evaporator.

Synthesis 3: Acrylate/Olefin Copolymer without Distillation Step (Ex.54)

0.77 g of DBPO (0.3 wt % relative to the monomer in the feed) dissolved in 249.3 g EHA and 5.7 g DEHF was slowly fed to 45.0 g of 1-Tetradecene under nitrogen at 160° C. for 3 hours. After stirring for another hour, the resulting clear and colorless polymer was cooled down and used without further purification.

Examples 1 to 28 were prepared in the same way as Synthesis 2, except that the amounts of reactants or other reaction conditions were changed as listed in Table 1. The alpha-olefin monomers are always first charged to the reactor and the (meth)acrylate monomers and the initiator are fed over a set period of time.

Examples 38 to 43 were prepared in the same way as Synthesis 1, except that the amounts of reactants or other reaction conditions were changed as listed in Table 3.

Examples 44 to 61 were prepared in the same way as Synthesis 3, except that the amounts of reactants or other reaction conditions were changed as listed in Table 4.

As the molar ratio in the reaction is not representative for the final composition, the final ratio of olefin in the polymer after distillation is given in weight % (olefin inc.). This ratio was determined gravimetrically under the assumption that the conversion of the (meth)acrylate is either complete or its boiling point is too high to be removed by the distillation. For example, Example 8 has a residual content of EHA of less than 0.01 wt % before the distillation step.

For some examples up to 3 polymers with similar viscosities were blended. For the blending process, the products were stirred together at 80° C. for an hour. The blends are listed in Table 2 (see examples 29 to 37). The amount of incorporated olefin was calculated from the values determined for the separate components. The other values such as molecular weight or viscosity were measured on the blend.

A good high viscosity base fluid needs to combine several properties. An important criterion for high-performance gear oils is the low temperature performance. Aside from a low dependency of the viscosity on the temperature, which is also reflected in the VI, it is important that the polymers do not show strong intermolecular interactions, leading to bad low temperature performance.

The polymers according to this invention have a favorable combination of viscosity, viscosity index and shear stability as exemplified with Example 5, 6 or 8. In contrast, it can be observed that the acrylate-olefin copolymer comparative example 7*, which comprises 22.6% by weight of linear side chains with more than 8 carbon atoms, has a good VI (236) but as shown in the lubricant formulation thereof (example F-21*), does not perform well at low temperature (BF −26=192,000 cP). In contrast, the acrylate-olefin copolymer inventive example 50 with only 15% by weight linear side chain with more than 8 carbon atoms combines both high VI (220) and as shown in the lubricant formulation thereof (example F-28) performs very well under even more severe low temperature conditions (BF −30=102,000 cP) (BF-30 instead of BF-26 for comparative example F-21*).

Surprisingly even longer side chains such as in inventive examples 48 (C12 side chain) or 51 (C14 side chain) perform on the same level as example 50 (C10 side chain) because the total amount of monomer units derived from monomers with linear alkyl group having more than 8 carbon atoms in total in the copolymer, is lower than 22% by weight, based on the total weight of the copolymer. The long linear side chains (more than 8 carbon atoms) can be any monomer units of the copolymer (any monomers a), b), c), d) or other comonomers) as shown in comparative example 13* which has 81% by weight of linear side chains of more than 8 carbon atoms due to a high content of laurylacrylate. As shown in comparative formulation F-38*, the high content of long linear side chains having more than 8 carbon atoms in the acrylate monomer units results in extremely poor low temperature performance (PP of −18° C.) despite a high VI (195), thus no good combination of high VI and good low temperature performance is achieved. The quantity of these sidechains is provided as ">C8 SC" in Tables 1 to 4.

While polymethacrylates are known as excellent VI improvers, they are surprisingly outperformed in the lower molecular weight range by their acrylate counterparts. This is exemplified in Table 5, where F-2 and F-3* are based on very similar polymers (based on EHA for inventive example 29 and EHMA for comparative example 20*), but a much higher VI of the EHA based polymer (inventive example 29) results in a higher VI of the final formulation and a better low temperature viscosity.

F-2 performs on a similar level as the PAO100 base formulation F-1*. Compared to pure polyolefins, the polar ester functions in the acrylate-olefin copolymer of the invention are beneficial for the overall compatibility of different formulation components (to allow the direct comparison with PAO100 the formulations in Table 4 were prepared without further additives). Different to PAOs, which have to be prepared by cationic or coordination polymerization methods, the radical polymerization process used for the preparation of the acrylate-olefin copolymers of the invention provides easy access to higher viscous products with good shear stability level in a commercially attractive way.

TABLE 1

Methacrylate-olefin copolymers or acrylate-olefin copolymers

| Ex# | (M)A | Olefin | Ini [wt %] | T[° C.] | Olefin [eq] | Olefin inc [wt %] | Mw [g/mol] | Mn [g/mol] | PDI | BV100 [cSt] | BV40 [cSt] | VI | >C8 SC [wt %] |
|---|---|---|---|---|---|---|---|---|---|---|---|---|---|
| Ex. 1 | EHA | Dec | 0.10 | 150 | 2.00 | 34.7 | 6,410 | 3,450 | 1.9 | 87.9 | n.m. | n.m. | 0.0 |
| Ex. 2 | EHA | Dec | 0.04 | 150 | 2.00 | 30.5 | 7,680 | 3,860 | 2.0 | 117.2 | n.m. | n.m. | 0.0 |
| Ex. 3 | EHA | Dec | 0.05 | 150 | 2.00 | 29.7 | 8,090 | 4,020 | 2.0 | 128.1 | n.m. | n.m. | 0.0 |
| Ex. 4 | EHA | Dec | 0.07 | 150 | 1.00 | 25.4 | 10,500 | 4,750 | 2.2 | 188.7 | 2479 | 196 | 0.0 |
| Ex. 5 | EHA | Dec | 0.07 | 150 | 0.60 | 20.7 | 14,900 | 5,770 | 2.6 | 306.3 | 4372 | 214 | 0.0 |
| Ex. 6 | EHA | Dec | 0.07 | 150 | 0.40 | 18.6 | 19,500 | 6,390 | 3.1 | 445.8 | 6573 | 233 | 0.0 |
| Ex. 7* | EHA | DoDec | 0.07 | 150 | 0.42 | 22.6 | 18,500 | 5,650 | 3.3 | 304.8 | 3551 | 236 | 22.6 |
| Ex. 8 | EHA | Dec | 0.30 | 160 | 0.33 | 18.2 | 15,600 | 5,980 | 2.6 | 299.7 | 4148 | 216 | 0.0 |
| Ex. 9 | HexA | Dec | 0.09 | 160 | 0.54 | 26.7 | 14,400 | 5,750 | 2.5 | 145.5 | 1425 | 214 | 0.0 |
| Ex. 10 | HexA | Dec | 0.08 | 160 | 0.54 | 26.2 | 14,300 | 6,260 | 2.3 | 160.1 | 1672 | 212 | 0.0 |
| Ex. 11 | HexA | Dec | 0.08 | 160 | 0.54 | 26.1 | 15,800 | 6,430 | 2.5 | 175.4 | 1809 | 218 | 0.0 |
| Ex. 12* | iTDA | Dec | 0.05 | 150 | 0.54 | 19.4 | 15,100 | 6,440 | 2.3 | 258.6 | 4107 | 194 | 0.0 |
| Ex. 13* | LA | Dec | 0.14 | 150 | 0.46 | 18.6 | 15,100 | 7,100 | 2.1 | 99.08 | 783.7 | 222 | 81.4 |
| Ex. 14 | PHA | Dec | 0.07 | 150 | 0.43 | 18.1 | 16,000 | 6,660 | 2.4 | 269.7 | 3221 | 226 | 0.0 |
| Ex. 15 | PHA | Dec | 0.08 | 150 | 0.43 | 17.9 | 15,400 | 6,580 | 2.3 | 259.8 | 3145 | 222 | 0.0 |
| Ex. 16 | nOA | Dec | 0.10 | 160 | 0.71 | 22.8 | 14,000 | 6,450 | 2.2 | 132.8 | 1294 | 210 | 0.0 |
| Ex. 17 | nOA | Dec | 0.10 | 160 | 0.61 | 23.4 | 14,700 | 6,570 | 2.2 | 138.3 | 1336 | 213 | 0.0 |
| Ex. 18* | EHMA | Dec | 0.10 | 155 | 2.00 | 25.8 | 11,200 | 3,570 | 3.2 | 452.6 | 12200 | 178 | 0.0 |
| Ex. 19* | EHMA | Dec | 0.30 | 155 | 2.00 | 31.3 | 6,210 | 2,720 | 2.3 | 143.8 | 2640 | 150 | 0.0 |
| Ex. 20* | EHMA | Dec | 0.50 | 155 | 2.00 | 32.7 | 5,430 | 2,550 | 2.1 | 110.9 | 1899 | 143 | 0.0 |
| Ex. 21* | IDMA | Dec | 0.80 | 150 | 2.00 | 31.2 | 6,550 | 2,920 | 2.2 | 129.5 | n.m. | n.m. | 0.0 |
| Ex. 22* | IDMA | Dec | 0.65 | 150 | 2.00 | 29.0 | 7,750 | 3,250 | 2.4 | 184.6 | n.m. | n.m. | 0.0 |
| Ex. 23* | IDMA | Dec | 0.10 | 155 | 2.00 | 21.5 | 12,200 | 3,790 | 3.2 | n.m. | n.m. | n.m. | 0.0 |
| Ex. 24* | IDMA | Dec | 0.07 | 155 | 2.00 | n.m. | 13,500 | 4,050 | 3.3 | n.m. | n.m. | n.m. | 0.0 |
| Ex. 25* | LMA | Dec | 0.12 | 150 | 1.50 | 18.2 | n.m. | n.m. | n.m. | 490.2 | n.m. | n.m. | 81.8 |
| Ex. 26* | LMA | Dec | 0.13 | 150 | 1.50 | 17.6 | n.m. | n.m. | n.m. | 442.0 | n.m. | n.m. | 82.4 |
| Ex. 27* | LMA | Dec | 0.20 | 155 | 2.00 | 23.7 | 10,700 | 4,000 | 2.7 | 131.7 | n.m. | n.m. | 85.3 |
| Ex. 28* | LMA | Dec | 0.12 | 155 | 2.00 | n.m. | 13,700 | 4,260 | 3.2 | 182.3 | n.m. | n.m. | 85 |

*means comparative examples

TABLE 2

Blends of copolymers from Table 1

| Ex# | Comp. 1 [wt %] | Comp. 2 [wt %] | Comp. 3 [wt %] | Olefin inc [wt %] | Mw [g/mol] | Mn [g/mol] | PDI | BV100 [cSt] | BV40 [cSt] | VI | >C8 SC [wt %] |
|---|---|---|---|---|---|---|---|---|---|---|---|
| Ex. 29 | 50% Ex. 1 | 50% Ex. 2 | n.m. | 32.6 | n.m. | n.m. | n.m. | 99.9 | 1,137 | 178 | 0.0 |
| Ex. 30 | 64% Ex. 3 | 36% Ex. 4 | n.m. | 28.3 | 8,940 | 4,260 | 2.1 | 146.9 | 1,800 | 190 | 0.0 |
| Ex. 31 | 34% Ex. 9 | 32% Ex. 10 | 34% Ex. 11 | 26.3 | 15,000 | 6,470 | 2.3 | 160.6 | 1,653 | 214 | 0.0 |
| Ex. 32 | 50% Ex. 14 | 50% Ex. 15 | n.m. | 18.0 | n.m. | n.m. | n.m. | 263.3 | 3,176 | 224 | 0.0 |
| Ex. 33 | 38% Ex. 16 | 62% Ex. 17 | n.m. | 23.2 | n.m. | n.m. | n.m. | 135.4 | 1,315 | 212 | 0.0 |
| Ex. 34* | 51% Ex. 21 | 49% Ex. 22 | n.m. | 30.1 | n.m. | n.m. | n.m. | 147.0 | 2,753 | 150 | 0.0 |
| Ex. 35* | 36% Ex.23 | 64% Ex. 24 | n.m. | n.m. | n.m. | n.m. | n.m. | 450.7 | 11,740 | 181 | 0.0 |
| Ex. 36* | 50% Ex. 25 | 50% Ex. 26 | n.m. | 17.9 | 23,900 | 5,940 | 4.0 | 468.1 | 8,699 | 213 | 82.1 |
| Ex. 37* | 64% Ex. 27 | 36% Ex. 28 | n.m. | n.m. | n.m. | n.m. | n.m. | 146.8 | 1,979 | 180 | 85 |

*means comparative examples

TABLE 3

Pure polyacrylates

| Ex# | (M)A | Solvent | Solvent [wt %] | Ini | Ini [wt %] | T [° C.] | ReMo | Mw [g/mol] | Mn [g/mol] | PDI | BV100 [cSt] | BV40 [cSt] | VI | >C10 SC [wt %] |
|---|---|---|---|---|---|---|---|---|---|---|---|---|---|---|
| Ex. 38* | EHA | Yubase 4 | 20 | DBPO | 0.5 | 160 | 0.04 | 9590 | 5020 | 1.9 | 67.4 | 712 | 168 | 0.0 |
| Ex. 39* | EHA | PAO8 | 10 | DBPO | 0.6 | 160 | 0.02 | 16400 | 6970 | 2.4 | 210.3 | 2942 | 195 | 0.0 |
| Ex. 40* | PHA | PAO8 | 85 | DCP | 0.5 | 150 | 0.01 | 14100 | 7270 | 1.9 | 145.8 | 1671 | 197 | 0.0 |
| Ex. 41* | IDA | Nexbase 3080 | 75 | DCP | 0.5 | 150 | n.m. | 15400 | 7490 | 2.1 | 83.0 | 975 | 166 | 0.0 |
| Ex. 42* | LA | Nexbase 3080 | 70 | DCP | 0.5 | 150 | n.m. | 15600 | 8530 | 1.8 | 43.0 | 314 | 192 | 100.0 |
| Ex. 43* | ITDA | Nexbase 3080 | 75 | DCP | 0.5 | 150 | n.m. | 14700 | 7270 | 2.0 | 95.9 | 1320 | 157 | 0.0 |

*means comparative examples

TABLE 4

Acrylate-olefin copolymers comprising monomer units of monomer c)

| Ex# | EHA [wt %] | PHA [wt %] | Olefin | Olefin [wt %] | DEHF [wt %] | Comonomer | Comonomer [wt %] | Ini [%] | Mw [g/mol] | Mn [g/mol] | PDI | BV100 [cSt] | BV40 [cSt] | VI | >C8 SC [wt %] |
|---|---|---|---|---|---|---|---|---|---|---|---|---|---|---|---|
| Ex. 44 | 83.1 | | TetDec | 15 | | DMAPMAM | 1.9 | 0.3 | 18,200 | 6,130 | 3.0 | 299.7 | 4,148 | 216 | 15.0 |
| Ex. 45 | 80 | | TetDec | 15 | | DMAPMAM | 5 | 0.3 | 16,600 | 5,380 | 3.1 | 273.0 | 3,988 | 206 | 15.0 |
| Ex. 46 | 83.1 | | TetDec | 15 | | DEHM | 1.9 | 0.3 | 19,800 | 6,310 | 3.1 | 300.5 | 4,043 | 219 | 15.0 |
| Ex. 47 | 80 | | TetDec | 15 | 5 | | | 0.3 | 16,200 | 5,820 | 2.8 | 283.9 | 3,823 | 216 | 15.0 |
| Ex. 48 | 80 | | TetDec | 15 | 5 | | | 0.3 | 17,100 | 6,030 | 2.8 | 301.8 | 4,125 | 218 | 15.0 |
| Ex. 49 | 80 | | Dec | 15 | 5 | | | 0.3 | 15,400 | 5,880 | 2.6 | 301.1 | 4,138 | 217 | 0.0 |
| Ex. 50 | 80 | | DoDec | 15 | 5 | | | 0.3 | 16,600 | 6,000 | 2.8 | 303.6 | 4,103 | 220 | 15.0 |
| Ex. 51 | 80 | | HexDec | 15 | 5 | | | 0.3 | 18,300 | 6,130 | 3.0 | 301.9 | 3,986 | 222 | 15.0 |
| Ex. 52 | | 83.1 | TetDec | 15 | 1.9 | | | 0.3 | 14,600 | 5,890 | 2.5 | 203.8 | 2,538 | 206 | 15.0 |
| Ex. 53 | 79.5 | | Dec | 15 | 5 | DMAPMAM | 0.5 | 0.15 | 15,300 | 5,880 | 2.6 | 280.5 | 3,878 | 213 | 15.0 |
| Ex. 54 | 83.1 | | Tetdec | 15 | 1.9 | | | 0.3 | 19,000 | 6,030 | 3.2 | 317.5 | 3,098 | 211 | 0.0 |
| Ex. 55 | 70 | 10 | Tetdec | 15 | 5 | | | 0.3 | 17,600 | 6,110 | 2.9 | 284.9 | 3,806 | 217 | 15.0 |
| Ex. 56 | 40 | 40 | Tetdec | 15 | 5 | | | 0.3 | 16,100 | 5,940 | 2.7 | 239.8 | 4,498 | 217 | 15.0 |
| Ex. 57 | 80 | | Dec | 15 | | VLA | 5 | 0.3 | 19,800 | 6,530 | 3.0 | 339.0 | n.m. | n.m. | 5.0 |
| Ex. 58 | 80 | | Dec | 15 | | SMA | 5 | 0.3 | 18,400 | 6,330 | 2.9 | 307.8 | n.m. | n.m. | 5.0 |

TABLE 4-continued

Acrylate-olefin copolymers comprising monomer units of monomer c)

| Ex# | EHA [wt %] | PHA [wt %] | Olefin | Olefin [wt %] | DEHF [wt %] | Comonomer | Comonomer [wt %] | Ini [%] | Mw [g/mol] | Mn [g/mol] | PDI | BV100 [cSt] | BV40 [cSt] | VI | >C8 SC [wt %] |
|---|---|---|---|---|---|---|---|---|---|---|---|---|---|---|---|
| Ex. 59 | 80 | | Dec | 15 | | LMA | 5 | 0.3 | 18,400 | 6,180 | 3.0 | 321.6 | n.m. | n.m. | 5.0 |
| Ex. 60 | 85 | | Dec | 14 | | MO | 1 | 0.7 | 18,600 | 6,190 | 3.0 | 330.9 | n.m. | n.m. | 0.0 |
| Ex. 61 | 80 | | TetDec | 15 | 5 | | | 0.3 | 17,800 | 6,160 | 2.9 | 322.9 | 4,295 | 225 | 15.0 |

TABLE 5

Lubricant formulations with 100 cSt high viscosity base fluids

| Form. Ex. | F-1* | F-2 | F-3* |
|---|---|---|---|
| PAO100 [wt %] | 22.3 | | |
| Ex. 29 [wt %] | | 31.5 | |
| Ex. 20* [wt %] | | | 29.8 |
| PAO4 [wt %] | 77.7 | 68.5 | 70.2 |
| KV40 [cSt] | 46.0 | 46.1 | 45.9 |
| KV100 [cSt] | 8.4 | 8.5 | 8.1 |
| VI | 162 | 164 | 151 |
| BF-40 [cP] | 11,000 | 12,200 | 14,000 |
| PP [° C.] | −66 | −66 | −66 |

*means comparative examples

Examples of formulations with EHA homopolymers can be found in Tables 6 and 7. For process reasons the pure acrylates shown in Table 3 were prepared as solutions in oil, so that no bulk properties are available for these polymers. In order not to influence the comparison of the copolymers, the oil used for the polymerization was the same which was later used in the formulations. As can be seen the mentioned EHA homopolymers (comparative examples 38* and 39*) provide lower VIs in the formulation and show poorer low temperature performance. As shown in Table 8, the comparative polyacrylate examples with longer side chains as the EHA homopolymers also do not perform as good as the inventive acrylate-olefin copolymers of the invention.

TABLE 6

Lubricant formulations with 150 cSt high viscosity base fluids

| Form. Ex. | F-4* | F-5 | F-6* | F-7* | F-8* |
|---|---|---|---|---|---|
| Ex. 38* [wt %] | 35.2 | | | | |
| Ex. 30 [wt %] | | 28.5 | | | |
| Ex. 19* [wt %] | | | 28.2 | | |
| Ex. 34* [wt %] | | | | 25.2 | |
| Ex. 37* [wt %] | | | | | 23.1 |
| VPL 1-300 [wt %] | 0.3 | 0.3 | 0.3 | 0.3 | 0.3 |
| Yubase 4 [%] | 64.5 | 71.2 | 71.5 | 74.5 | 76.6 |
| KV40 [cSt] | 49.7 | 48.6 | 49.2 | 46.2 | 46.7 |
| KV100 [cSt] | 8.9 | 8.9 | 8.6 | 8.2 | 8.8 |
| VI | 161 | 166 | 152 | 153 | 172 |
| BF-40 [cP] | 90,000 | 55,000 | 83,000 | 77,000 | solid |
| PP [° C.] | −42 | −39 | −42 | −39 | −39 |

*means comparative examples

TABLE 7

Lubricant formulations with 450 cSt high viscosity base fluids

| | Form. Ex. | | | | | | | |
|---|---|---|---|---|---|---|---|---|
| | F-9* | F-10 | F-11* | F-12* | F-13* | F-14 | F-15* | F-16* |
| Ex. 39* [wt %] | 55.0 | | | | 55.1 | | | |
| Ex. 6 [wt %] | | 47.0 | | | | 47.4 | | |
| Ex. 18* [wt %] | | | 45.0 | | | | 43.6 | |
| Ex. 35* [wt %] | | | | 43.0 | | | | 42.1 |
| RC9420 [wt %] | 2.0 | 2.0 | 2.0 | 2.0 | | | | |
| Hitec 307 [wt %] | | | | | 2.7 | 2.7 | 2.7 | 2.7 |
| VPL 1-180 [wt %] | | | | | 0.7 | 0.7 | 0.7 | 0.7 |
| NB3080 [wt %] | | | | | 41.6 | 43.4 | 53.1 | 54.6 |
| PAO8 [wt %] | 43.0 | 51.0 | 53.0 | 55.0 | | | | |
| KV40 [cSt] | 312.9 | 320.3 | 325.3 | 318.9 | 314.9 | 326.5 | 312.6 | 312.7 |
| KV100 [cSt] | 36.4 | 39.5 | 34.5 | 34.5 | 36.3 | 39.6 | 33.4 | 33.8 |
| VI | 164 | 176 | 150 | 153 | 163 | 174 | 149 | 152 |
| BF-26 [cP] | 74,000 | 49,000 | 74,000 | 77,000 | n.m. | n.m. | n.m. | n.m. |
| PP [° C.] | −39 | −45 | −42 | −45 | −36 | −39 | n.m. | −39 |

*means comparative examples

TABLE 8

Lubricant formulations with pure polyacrylate high viscosity base fluids

| Form. Ex. | F-17* | F-18* | F-190* | F-20* |
|---|---|---|---|---|
| Ex. 40* [wt %] | 62.4 | | | |
| Ex. 41* [wt %] | | 67.5 | | |
| Ex. 42* [wt %] | | | 96.6 | |
| Ex. 43* [wt %] | | | | 62.0 |
| Viscoplex 1-180 [wt %] | 0.7 | 0.7 | 0.7 | 0.7 |
| Hitec 307 [wt %] | 2.7 | 2.7 | 2.7 | 2.7 |
| Nexbase 3080 [wt %] | | 29.1 | | 34.6 |
| PAO8 [wt %] | 34.9 | | | |
| KV40 [cSt] | 328.1 | 314.5 | 315.5 | 313.6 |
| KV100 [cSt] | 38.1 | 35.2 | 42.9 | 33.1 |
| VI | 166 | 158 | 193 | 147 |
| BF-26 [cP] | 81,000 | 220,000 | solid | 212,000 |
| PP [° C.] | −45 | −39 | −6 | −36 |

*means comparative examples

TABLE 9

Residual monomers of the polymers (all amounts in wt %) described in Table 4

| Ex# | EHA | PHA | Olefin | DEHF | Comonomer |
|---|---|---|---|---|---|
| Ex. 44 | 0.12% | | 0.87% | | 0.01% |
| Ex. 45 | 0.26% | | 1.09% | | 0.03% |
| Ex. 46 | 0.07% | | 0.32% | | 0.57% |
| Ex. 47 | 0.13% | | 0.33% | 0.16% | |
| Ex. 48 | 0.08% | | 0.35% | 0.11% | |
| Ex. 49 | 0.06% | | 0.58% | 0.07% | |
| Ex. 50 | 0.05% | | 0.40% | 0.05% | |
| Ex. 51 | 0.04% | | 0.25% | 0.10% | |
| Ex. 52 | | 0.14% | 0.47% | 0.04% | |
| Ex. 53 | 0.11% | | 0.72% | 0.12% | 0.00% |
| Ex. 54 | 0.07% | | 0.37% | 0.05% | |
| Ex. 55 | 0.07% | 0.07% | 0.38% | 0.0% | |
| Ex. 56 | 0.03% | 0.10% | 0.36% | 0.08% | |
| Ex. 57 | 0.02% | | 0.57% | | n.m. |
| Ex. 58 | 0.04% | | 0.75% | | n.m. |
| Ex. 59 | 0.04% | | 0.71% | | n.m. |
| Ex. 60 | 0.02% | | 0.48% | | 0.53% |
| Ex. 61 | 0.06% | | 0.03% | 0.08% | |

High-performance lubricants also need to fulfill many requirements. Especially excellent low temperature properties, high flashpoints and good ageing behavior are directly influenced by the choice of high viscosity base fluids.

In Table 10 below, it is shown that the inventive acrylate-olefin copolymers of the invention have high flashpoints, which fulfills the requirements for gear oil applications.

The effect of different PAO viscosity grades is shown in Table 11 below (PAO4, PAO 6, PAO8). Lower grades such as PAO4 allow the use of higher amount of acrylate-olefin copolymer of the invention, which improves VI and low temperature performance of the resulting formulations even further. For inventive formulation F-23, further performance parameters are provided which are important for industrial gear oil formulations. The strong performance in the TOST and RPVOT test shows the good stability towards severe thermo-oxidative stress. The low foaming tendency and low corrosiveness of the formulation underline the suitability of the acrylate-olefin copolymers of the invention in gear oil formulations.

TABLE 10

Flashpoint of some high viscosity base fluids

| Example | COC [° C.] |
|---|---|
| Ex. 53 | 256 |
| Ex. 61 | 271 |
| Ex. 5 | 260 |

TABLE 11

320 cSt lubricant formulations with base oils of different viscosity

| Form. Ex. | F-21 | F-22 | F-23 | F-24 | F-25 |
|---|---|---|---|---|---|
| Ex. 7* [wt %] | 51.2 | | | | |
| Ex. 5 [wt %] | | 51.6 | 63.3 | 57.5 | 51.9 |
| Hitec 3250 [wt %] | 2.0 | 2.0 | 2.0 | 2.0 | 2.0 |
| PAO4 [wt %] | | | 34.7 | | |
| PAO6 [wt %] | | | | 40.5 | |
| PAO8 [wt %] | 46.8 | 46.4 | | | 43.6 |
| Priolube 3970 [wt %] | | | | | 2.5 |
| Hitec 3250 [wt %] | 2.0 | 2.0 | 2.0 | 2.0 | 2.0 |
| Hitec 2030 [wt %] (**) | | | 0.02 | 0.02 | 0.02 |
| KV40 [cSt] | 321.9 | 319.8 | 326.1 | 318.4 | 316.7 |
| KV100 [cSt] | 40.3 | 38.9 | 41.83 | 39.87 | 38.66 |
| VI | 179 | 173 | 184 | 178 | 173 |
| BF-26 [cP] | 192,000 | 50,000 | 50,000 | n.m. | n.m. |
| BF-30 [cP] | n.m. | n.m. | 81,000 | 82,000 | 88,000 |
| Copper Corrosion | n.m. | n.m. | 1b | n.m. | n.m. |
| Steel Corrosion | n.m. | n.m. | free of rust | n.m. | n.m. |
| TOST KV100 increase [%] | n.m. | n.m. | 6 | n.m. | n.m. |
| RPVOT [min] | n.m. | n.m. | 292 | n.m. | n.m. |
| Foam after Sequence I [mL] | n.m. | n.m. | 20 | n.m. | n.m. |
| Foam after Sequence II [mL] | n.m. | n.m. | 10 | n.m. | n.m. |
| Foam after Sequence III [mL] | n.m. | n.m. | 20 | n.m. | n.m. |
| PP [° C.] | −51 | −48 | −48 | −48 | −51 |
| SL KRL20 100° C. [%] | 1.5 | 0.6 | n.m. | n.m. | n.m. |
| SL KRL100 100° C. [%] | n.m. | n.m. | 3.6 | 2.5 | n.m. |

*means comparative example
(**) added on top

Performance of the polymers without the distillation step is shown in Tables 12 and 13 below and is on a similar level as the distilled samples (Table 1). Care needs to be taken with regard to the comparison of different formulations in PAO8 as two different samples were used. While "PAO8" has excellent low temperature properties, "PAO8 I" shows slightly inferior low temperature properties at an improved VI level.

TABLE 12

320 cSt lubricant formulations with different high viscosity base fluids

| Form. Ex | F-26 | F-27 | F-28 | F-29 | F-30 | F-31 | F-32 | F-33 | F-34 | F-35 |
|---|---|---|---|---|---|---|---|---|---|---|
| Ex. 5 [wt %] | 53.2 | | | | | | | | | |

TABLE 12-continued 320 cSt lubricant formulations with different high viscosity base fluids

| | Form. Ex | | | | | | | | | |
|---|---|---|---|---|---|---|---|---|---|---|
| | F-26 | F-27 | F-28 | F-29 | F-30 | F-31 | F-32 | F-33 | F-34 | F-35 |
| Ex. 49 [wt %] | | 54.2 | | | | | | | | |
| Ex. 50 [wt %] | | | 54.0 | | | | | | | |
| Ex. 51 [wt %] | | | | 53.0 | | | | | | |
| Ex. 54 [wt %] | | | | | 52.4 | | | | | |
| Ex. 46 [wt %] | | | | | | 52.6 | | | | |
| Ex. 44 [wt %] | | | | | | | 52.6 | | | |
| Ex. 45 [wt %] | | | | | | | | 53.6 | | |
| Ex. 47 [wt %] | | | | | | | | | 54.4 | |
| Ex. 48 [wt %] | | | | | | | | | | 53.4 |
| Hitec 3250 [wt %] | 2.0 | 2.0 | 2.0 | 2.0 | 2.0 | 2.0 | 2.0 | 2.0 | 2.0 | 2.0 |
| PAO8 I [wt %] | 44.8 | 43.8 | 44.0 | 45.0 | 45.6 | 45.4 | 45.5 | 44.4 | 43.4 | 44.4 |
| KV40 [cSt] | 318.8 | 320.2 | 322.1 | 317.7 | 317.7 | 316.6 | 321.1 | 323.9 | 322.5 | 323.3 |
| KV100 [cSt] | 39.3 | 38.6 | 39.1 | 39.1 | 39.2 | 39.2 | 38.9 | 37.7 | 39.3 | 39.6 |
| VI | 175 | 172 | 173 | 175 | 176 | 176 | 173 | 178 | 174 | 175 |
| BF-30 [cP] | 89k | 116k | 102k | 102k | 96k | 97k | 114k | 124k | 102k | 93k |
| PP [° C.] | −39 | −39 | −39 | −39 | −39 | −39 | −39 | −36 | −39 | −39 |
| SL KRL100 100° C. [%] | 6.3 | 2.4 | 3.1 | 4.7 | 5.0 | 5.7 | 4.8 | 2.8 | 3.4 | 4.3 |

"k" means thousands (10³) e.g. BF-30 [cP] 89k cP = 89,000 cP

TABLE 13

320 cSt lubricant formulations with different high viscosity base fluids

| | Form. Ex | | | | | | |
|---|---|---|---|---|---|---|---|
| | F-36 | F-37* | F-38* | F-39 | F-40 | F-41 | F-42 |
| Ex. 31 [wt %] | 60.0 | | | | | | |
| Ex12* [wt %] | | 50.0 | | | | | |
| Ex13* [wt %] | | | 71.8 | | | | |
| Ex. 32 [wt %] | | | | 53.8 | | | |
| Ex. 33 [wt %] | | | | | 63.5 | | |
| Ex. 52 [wt %] | | | | | | 57.7 | |
| Ex. 8 [wt %] | | | | | | | 52.1 |
| Hitec 3250 [wt %] | 2.0 | 2.0 | 2.0 | 2.0 | 2.0 | 2.0 | 2.0 |
| PAO8 [wt %] | 38.0 | 48.0 | 26.2 | 44.2 | 34.5 | 40.3 | 45.9 |
| KV40 [cSt] | 323.0 | 322.0 | 323.2 | 323.6 | 322.8 | 322.8 | 319.6 |
| KV100 [cSt] | 41.1 | 36.6 | 44.2 | 39.5 | 41.7 | 38.7 | 38.1 |
| VI | 182 | 162 | 195 | 174 | 185 | 171 | 170 |
| BF-30 [cP] | 95,000 | 140,000 | solid | 96,000 | 84,000 | 104,000 | 104,000 |
| PP [° C.] | −48 | −42 | −18 | −45 | −48 | −48 | −45 |
| SL KRL20 100° C. [%] | 2.7 | n.m. | 1.6 | 5.2 | 2.2 | 3.6 | 3.5 |

The invention claimed is:
1. A copolymer comprising:
a) from 65 to 90% by weight, based on the total weight of the copolymer, of monomer units derived from at least one acrylate of Formula (I),

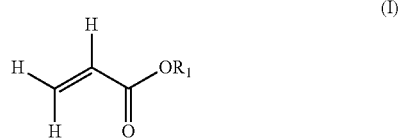

(I)

wherein R$_1$ means a linear or branched alkyl group having from 6 to 12 carbon atoms,
b) from 10 to 35% by weight, based on the total weight of the copolymer, of monomer units derived from at least one non-functionalized alpha-olefin of formula (II),

(II)

wherein R$_2$ means a linear alkyl group having from 6 to 16 carbon atoms,
and
c) from 0 to 10% by weight of monomer units derived from at least one monomer selected from the list consisting of methacrylamides, fumarates, maleates or a mixture thereof, based on the total weight of the copolymer; and
wherein the copolymer has a kinematic viscosity from 80 to 600 cSt at 100° C. according to ASTM D 445, and wherein the copolymer comprises from 0 to 22% by weight of monomer units derived from monomers with linear alkyl group having more than 8 carbon atoms, based on the total weight of the copolymer, and wherein the copolymer of the invention has a COC flash point above 250° C. according to ASTM D92.

2. The copolymer according to claim 1, wherein the copolymer comprises from 0 to 20% by weight, of monomer units derived from monomers with linear alkyl group having more than 8 carbon atoms, based on the total weight of the copolymer.

3. The copolymer according to claim 1, wherein the copolymer has a kinematic viscosity from 100 to 500 cSt at 100° C. according to ASTM D 445.

4. The copolymer according to claim 1, wherein the copolymer comprises 10 to 30% by weight, preferably from 10 to 25% by weight, of monomer units b) derived from the non-functionalized alpha-olefin of Formula (II), based on the total weight of the copolymer.

5. The copolymer according to claim 1, wherein the non-functionalized alpha-olefin b) of Formula (II) is selected from the group consisting of decene, dodecene, tetradecene, hexadecene or a mixture thereof.

6. The copolymer according to claim 1, wherein R$_1$ in the acrylate of Formula (I) is a linear or branched alkyl group having from 6 to 10 carbon atoms.

7. The copolymer according to claim 1, wherein the copolymer comprises 0 to 7% by weight, of monomer units derived from monomer c), based on the total weight of the copolymer.

8. The copolymer according to claim 1, wherein the total amount of monomer units derived from monomers a) and b) in the copolymer sums up to 90% by weight, based on the total weight of the copolymer.

9. The copolymer according to claim 1, wherein the total amount of monomer units derived from monomers a), b) and c) in the copolymer sums up to 90% by weight, based on the total weight of the copolymer.

10. The copolymer according to claim 1, wherein the copolymer has a weight average molecular weight from 5,000 to 30,000 g/mol according to DIN 55672-1.

11. The copolymer according to claim 1, wherein the copolymer has a PDI from 1 to 4.

12. The method for the preparation of a copolymer as defined in claim 1, wherein the method comprises the steps of:
i) providing a monomer composition, and
ii) initiating radical polymerization in the monomer composition to obtain the copolymer.

13. A lubricant composition comprising one or more base oil and at least one copolymer according to claim 1.

14. A lubricant additive comprising the copolymer as defined in claim 1.

15. The copolymer according to claim 1, wherein the copolymer has a kinematic viscosity from 150 to 400 cSt at 100° C. according to ASTM D 445.

16. A synthetic base fluid comprising the copolymer as defined in claim 1.

17. The copolymer according to claim 1, wherein the copolymer has a PDI from 1.5 to 3.5.

18. The copolymer according to claim 1, wherein the copolymer has a weight average molecular weight from 8,000 to 20,000 g/mol according to DIN 55672-1.

19. The copolymer according to claim 1, wherein the total amount of monomer units derived from monomers a), b) and c) in the copolymer sums up to 100% by weight, based on the total weight of the copolymer.

* * * * *